(12) United States Patent
Caddell

(10) Patent No.: US 8,276,859 B1
(45) Date of Patent: Oct. 2, 2012

(54) LEVELING MECHANISM

(75) Inventor: John Phillip Caddell, Pace, FL (US)

(73) Assignee: Reliability Solutions, LLC, Walnut Hill, FL (US)

( * ) Notice: Subject to any disclaimer, the term of this patent is extended or adjusted under 35 U.S.C. 154(b) by 645 days.

(21) Appl. No.: 11/304,339

(22) Filed: Dec. 15, 2005

(51) Int. Cl.
*F16M 11/24* (2006.01)
*F16M 1/00* (2006.01)

(52) U.S. Cl. ............... 248/188.4; 248/650; 248/656; 248/677

(58) Field of Classification Search ........... 248/188.2, 248/188.4, 188.8, 649, 650, 656, 677, 678, 248/657; 411/339, 384
See application file for complete search history.

(56) References Cited

U.S. PATENT DOCUMENTS

| | | | |
|---|---|---|---|
| 1,120,809 A | 12/1914 | Goodnow | |
| 1,987,726 A * | 1/1935 | Wilkerson et al. | 248/657 |
| 2,911,169 A | 11/1959 | Contreras | |
| 3,006,606 A * | 10/1961 | Pohl et al. | 254/101 |
| 3,306,562 A | 2/1967 | Bellefleur | |
| 3,361,410 A | 1/1968 | Messer | |
| 3,669,393 A * | 6/1972 | Paine et al. | 248/188.4 |
| 4,061,298 A * | 12/1977 | Kober | 248/677 |
| 4,068,961 A * | 1/1978 | Ebner et al. | 248/181.1 |
| 4,108,407 A * | 8/1978 | Cable et al. | 248/656 |
| 4,354,654 A * | 10/1982 | Werner et al. | 248/371 |
| 4,433,824 A * | 2/1984 | Koosha | 248/662 |
| 4,542,872 A * | 9/1985 | Marino et al. | 248/183.3 |
| 4,974,801 A | 12/1990 | Pulsifer | |
| 5,842,678 A * | 12/1998 | Svejkovsky | 248/650 |
| 6,068,234 A * | 5/2000 | Keus | 248/637 |
| 6,116,565 A * | 9/2000 | Reinke et al. | 248/562 |
| 6,702,246 B1 | 3/2004 | Schriever | |
| 6,889,946 B2 | 5/2005 | Bizaj | |
| 7,232,104 B2 * | 6/2007 | Krapels | 248/677 |

FOREIGN PATENT DOCUMENTS

| | | |
|---|---|---|
| EP | 0 316 283 A1 | 5/1989 |
| JP | 04019497 A | 1/1992 |

* cited by examiner

*Primary Examiner* — Tan Le
(74) *Attorney, Agent, or Firm* — C. Brandon Browning; Maynard Cooper & Gale PC

(57) ABSTRACT

An equipment mounting and aligning device including a base having an upwardly facing convex portion and a swivel pad having a downwardly facing concave portion, the swivel pad being pivotally supported on the base by means of the complimentary concave and convex portions which, when joined, interact to allow the swivel pad to pivot to compensate for a piece of equipment's bent or irregular mounting feet and for uneven mounting surfaces.

9 Claims, 4 Drawing Sheets

LEVELING MECHANISM

FIELD OF THE INVENTION

The present invention relates to a leveling device and more particularly to a device for mounting and leveling heavy loads on a surface.

BACKGROUND OF THE INVENTION

Pumps and the like must be coupled to a driver component, usually an electric motor, in order to drive or turn the pump shaft. To do this, a coupling is connected between the pump and driver which transmits torque from the driver to the pump. It is important that the centerline of the pump is perfectly aligned with the centerline of the driver, otherwise problems can arise including, for example, extreme heat and gear wear in the coupling, cracked or failed shafts from the constant flexing of the rotating shaft, overheating and fatigue problems, uneven face loading with stationary design mechanical seals and excessive axial movement of rotating design seals. Although a coupling can compensate for axial growth of the shaft due to thrusting or thermal growth, its cannot compensate for radial misalignment between the pump and driver. Thus, radial misalignment must be corrected by other means.

Two popular alignment methods being used in industry include the reverse indicator method and laser aligning. With the reverse indicator method, alignment is done in three stages: determining where the components are located in relationship to each other; calculating what has to be moved and how far to make the centerline of the pump line up with the centerline of the driver; and moving the hardware, usually the driver. Laser aligning utilizes laser equipment which does an excellent job of making the measurements and calculating the amount of movement necessary, but one still has to move the hardware which is usually the most difficult part of alignment, in part, because of the lack of jack bolts on smaller pumps.

The task of aligning the centerlines of coupled hardware becomes more difficult when the surface on which hardware is to be mounted uneven. Typically, an appropriate combination of metal shims have to be placed between the mounting feet of a piece of equipment and the surface on which the equipment is mounted. This way, the piece of equipment can be raised and lowered as required to match the centerline of the equipment with the centerline of a motor or driver to which the equipment is coupled. For example, if a motor is coupled to a pump and the motor is too high or too low, thin metal shims are installed or removed to place the motor's centerline in alignment with the centerline of the pump.

Once a piece of equipment is mounted and aligned, over time the feet of the equipment can rust, leaving pits and irregularities in the feet. Further, it is not uncommon for the feet to settle into a warped state. Pitting and warping of the feet can lead to an unsatisfactory condition where the equipment becomes misaligned with a motor to which it is coupled. Since it is typically too expensive or impractical to replace or resurface such feet, additional shims are usually installed to restore alignment of the equipment and motor. As a result, the shim thickness between the various feet of the equipment can begin to vary greatly creating the potential for another misalignment situation called angular soft/foot. Angular soft/foot affects the thickness of a shim causing a shim having a constant thickness to deform into a shim of irregular thickness. This is a difficult problem to overcome since shims are designed only to take up space between two parallel surfaces. There is a procedure used occasionally for resolving angular soft/foot known as step shimming. Step shimming involves staggering shims underneath a foot and maneuvering a wedge between the foot and shim. However, this often results in an arrangement where very little surface contact exists between the foot and its mounting surface.

OBJECTS AND SUMMARY OF THE INVENTION

A primary object of the invention is to provide an equipment mounting device and method of using same.

A further primary object of the invention is to provide an equipment leveling device and method of using same.

A further primary object of the invention is to provide a method of mounting and leveling a heavy load.

A further primary object of the invention is to provide a device and method for installing machinery on an uneven or inclined surface.

A further object of the invention is to provide a method of aligning a centerline of a piece of equipment with a centerline of another piece of equipment.

Another object of the invention is to provide a device and method of using same for preventing angular soft/foot.

The objects of the invention are accomplished by providing a number of devices that connect between the mounting feet of a heavy load and a mounting surface, each such device incorporating a self-leveling pad which eliminates angular foot to base contact. In particular, each device includes a base that accommodates a single foot of the load and a swivel pad complementary with pad that is pivotally supported on the base between the base and the foot of the equipment. The pad is pivotally supported on the base by means of complimentary concave and convex surfaces which, when joined, interact to allow the swivel pad to pivot to compensate for an irregular or worn mounting foot for uneven mounting surfaces.

The complimentary concave and convex surfaces each have a set radius for allowing a predetermined amount of movement between the concave and convex surfaces when the surfaces are joined. Preferably, the radii of each of the joined concave and convex surfaces allows enough movement therebetween to compensate for about 10° angularity between the top side of the swivel pad and the bottom side of the base. In particular, if the radii of the complimentary concave and convex surfaces are too large, an excessive amount of horizontal movement of the swivel pad is necessary to obtain 10° angularity between the top side of the swivel pad and the bottom side of the base, assuming it can be attained. Further, too much horizontal movement of the swivel pad can obstruct access to the base pad's hold down or anchor bolts. Alternatively, if the radii of the complimentary concave and convex surfaces are too small, when joined, the total amount of contacting surface area between the concave surface and the convex surface would be excessively small which can decrease the strength and rigidity between the swivel pad and base. Further, the excessively small amount of contacting surface area can cause the swivel pad to deform under a heavy load.

To make easier the swiveling of the swivel pad on the base, it is anticipated that, when joined, the complimentary concave and convex surfaces define a space therebetween. Thus, the entire respective surface areas of the joined concave and convex surfaces may not be in contact thereby decreasing the amount of friction to be overcome when sliding the surface across one another. One approach for forming a space between the concave and convex surfaces is to provide a substantially flat portion or depression about the apex of the convex surface. This way, a space is formed between the joined concave and convex surfaces which decreases the amount of friction between them when the swivel pad is manipulated on the base since the amount of surface area in contact between the convex and concave surfaces is decreased. In an alternative approach, both the concave surface and the convex surface include a substantially flat portion or depression.

To connect a foot of a piece of equipment to the device, the base is equipped with a mounting stud anchored in the concave surface that extends upwards therefrom through an aperture in the convex surface of the swivel pad to connect with the foot. The aperture has a set diameter that is greater than the diameter of the stud to ensure that a predetermined amount of clearance exists between the wall of the aperture and the stud. This way, the swivel pad can be pivoted on the base while the stud is located through the aperture. Preferably, the diameter of the aperture relative to the diameter of the stud is sufficient to obtain 10° angularity between the top side of the swivel pad and the bottom side of the base.

To connect the base with a mounting surface, there are arranged around the convex surface at the corners of the base a set of uniquely designed mounting points. The design of the mounting points allows horizontal movement of the base across the mounting surface in any direction during alignment operations, even when mounting bolts anchored in the mounting surface are connected to the base by nuts and washers. Specifically, each of the mounting points is defined by a counter bored area having a hole through the center thereof. Each hole has diameter that is greater than the diameter of the mounting bolts so that a predetermined amount of clearance between the bolt and wall of the hole is present. This way, a mounting bolt can be inserted through each hole of each mounting point and the base can nevertheless be adjusted horizontally across the mounting surface. However, with this arrangement, the base can partially or completely disengage from the mounting bolts and mounting surface during alignment operations. This is undesirable since equipment to be aligned is supported by the base. If the base disengages from a mounting bolt, the equipment can tilt, become unbalanced and ultimately turn over on its side.

By providing a hold down washer and nut according to the present invention, the base can be connected with mounting bolts and still maintain the ability to be adjusted horizontally across the mounting surface without being completely disengaged from the mounting bolts. Thus, each hold down washer includes an opening for receiving a mounting bolt, the opening having a diameter substantially equal to the diameter of the bolt, and a locking boss protruding from one side of the washer that is shaped to fit snuggly within the hole. During alignment operations, when it is desired to move the base while preventing disengagement with the mounting bolts, a hold down washer is placed over each mounting bolt with the mounting boss facing upwards. A nut is then tightened over the exposed end of each bolt so that the base cannot be disengaged from the mounting bolts by operation of the washers. Since the diameter of the bolts is less than the diameter of the respective holes in the base, the base can be horizontally adjusted in any direction, limited only by the amount of clearance between the bolts and the walls of the holes. Thus, each of the counter bored areas has a circumference or perimeter that is great enough to accommodate a washer without limiting the movement of the base about the mounting bolts. Another feature of the base is a detachable side-mounted jackscrew that enables slow, easy movement of the base from side to side during alignment.

When it is desired to fix the base to the mounting surface, each washer is removed from its respective bolt, flipped over and placed back onto the bolt with locking boss inserted into the hole. The nut is then tightened onto the exposed end of the bolt. This way, the based is fixed to the mounting surface with the locking boss preventing horizontal movement of the base and the nut and washer preventing vertical movement of the base. Thereafter, the swiveling action between the concave and convex surfaces of the swivel pad and base, respectively, can be utilized to allow the equipment mounted on the leveling pad of the device to be leveled on most any type of structurally sound and rigid framework, whether the surface is a flat machined surface or an uneven or pitched surface. This is done by simply applying pressure on one side or another of the equipment to tilt it. In addition, if the equipment also needs raising about one or more of its feet, shims can be installed in a parallel fashion between the topside of the leveling pads and feet of the equipment to whatever thickness is needed. Using one of the leveling methods discussed above, i.e., reverse indicator method or laser alignment, the correct alignment of the equipment can be attained. Thereafter, if angular soft/foot is detected and the centerlines of mounted equipment become off-set, the nuts can be removed from the mounting bolts and additional shims and/or leveling can be implemented to regain correct alignment of the machinery.

DETAILED DESCRIPTION OF PRESENTLY PREFERRED EMBODIMENTS

Figure 1:
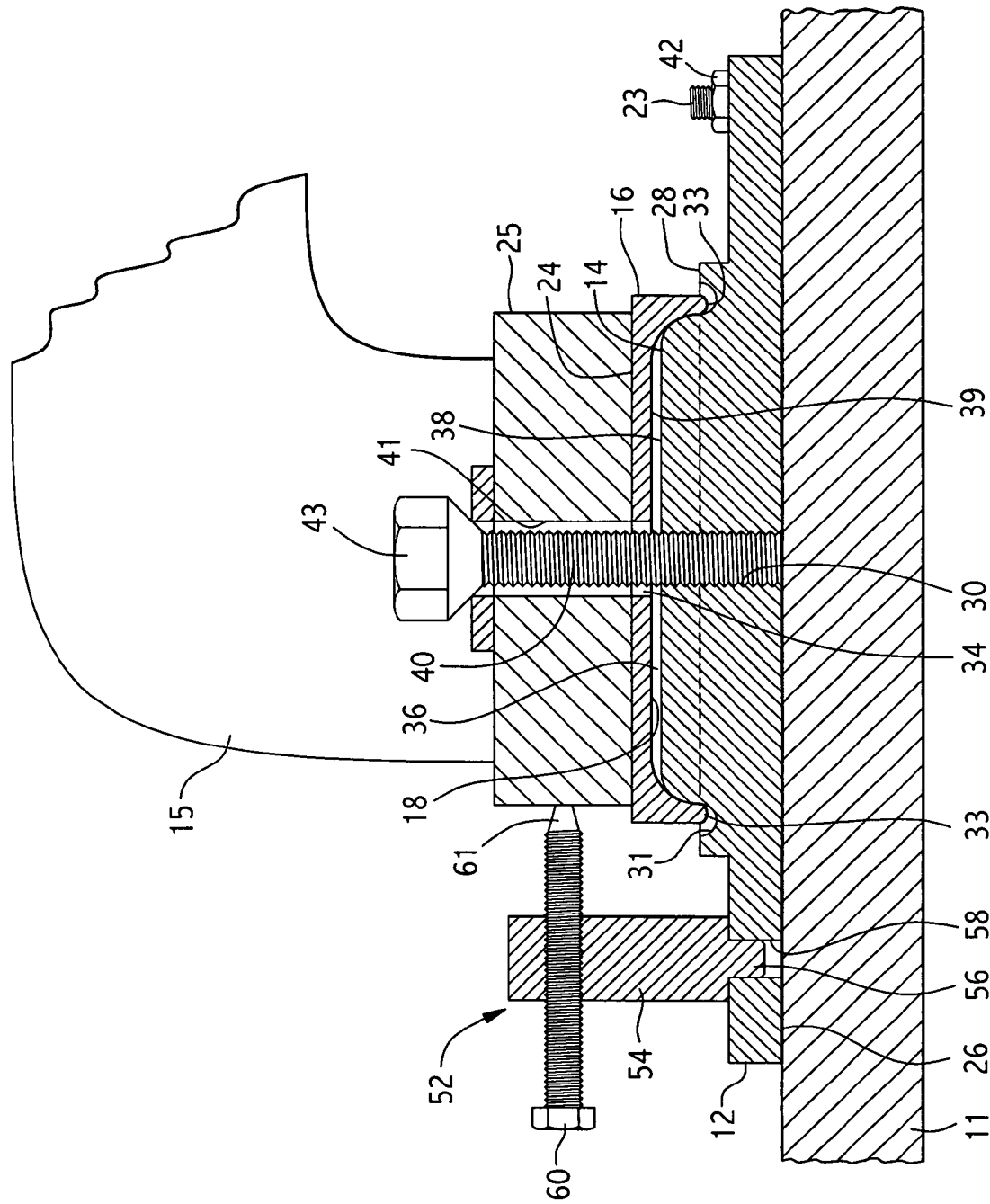
FIG. 1 is a sectional view of a mounting and leveling device according to the preferred embodiment of the present invention connected with and supporting a foot of a piece of equipment.

The preferred embodiment of the present invention is illustrated in FIGS. 1-8, where like portions share like numbering. Generally, as illustrated at FIG. 1, the equipment mounting and leveling device 10 of the present invention includes a base pad 12 for attaching device 10 to a mounting surface 11, base pad 12 including an upwardly facing circular convex portion 14, and a swivel pad 16 for selectively pivotally supporting a piece of equipment 15 on base pad 12. Swivel pad 16 includes a downwardly facing circular concave portion 18 that, when in use, is directed toward and selectively pivotally joined with convex portion 14. Mounting points 20 are provided around convex portion 14 on base pad 12 for connecting base pad 12 to a mounting surface 11. Each of mounting points 20 includes a mounting hole 22 through base pad 12 for receiving an anchor bolt 23 fixedly attached to mounting surface 11. Typically, four devices 10 and four sets of four anchor bolts 23 are required to mount equipment 15.

Figure 2:
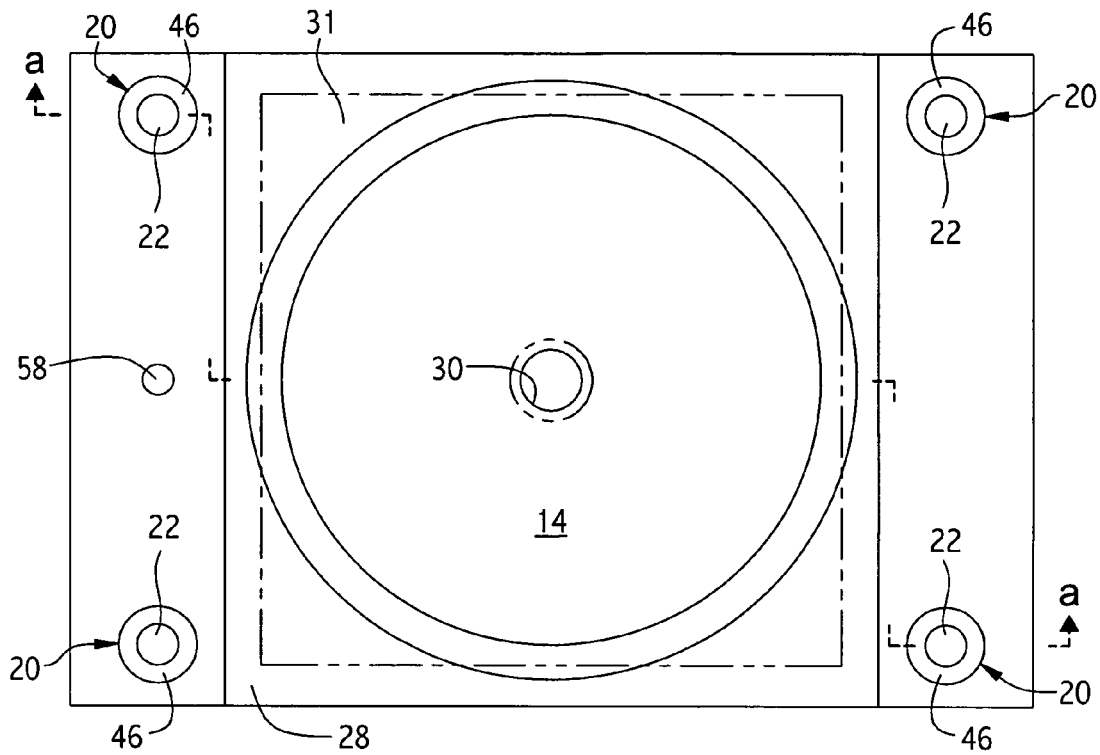
FIG. 2 is a top view of a base of the device of FIG. 1.
Figure 3:
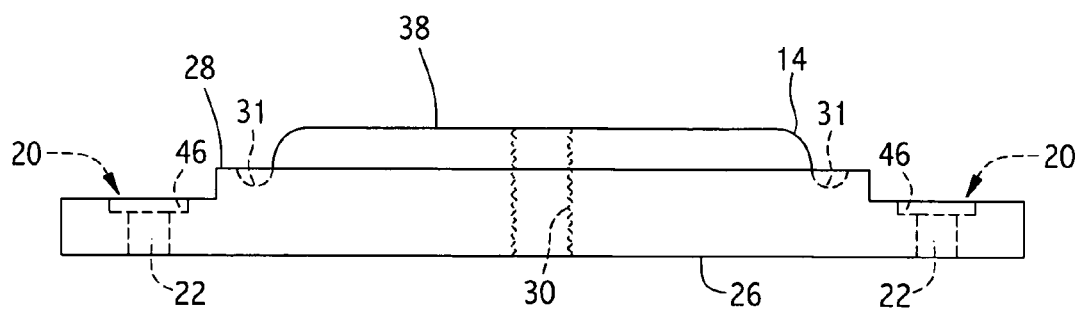
FIG. 3 is an elevational view of the base of FIG. 2.

As illustrated in FIGS. 2 and 3, base pad 12 is comprised of an essentially flat, rectangular unitary metal slab, the slab having a substantially flat, lower surface 26 for interacting with mounting surface 11 and an upper surface 28 that includes upwardly projecting convex portion 14. It is preferred that lower surface 26 has a rough finish for biting into surface 11 for a more secure attachment thereto. Convex portion 14 is centered on upper surface 28 and includes a threaded opening 30 that extends through a center of convex portion 14 thereby connecting lower surface 26 with upper surface 28. A depression 31 is provided completely around convex portion 14 for allowing full movement of swivel pad 16 about base pad 12. Depression 31 is generally rectangularly shaped in order to receive, if necessary, a lower edge 33 of rectangular swivel pad 16 when pad 16 is pivoted completely or nearly completely to one side or another on convex portion 14.

Figure 4:
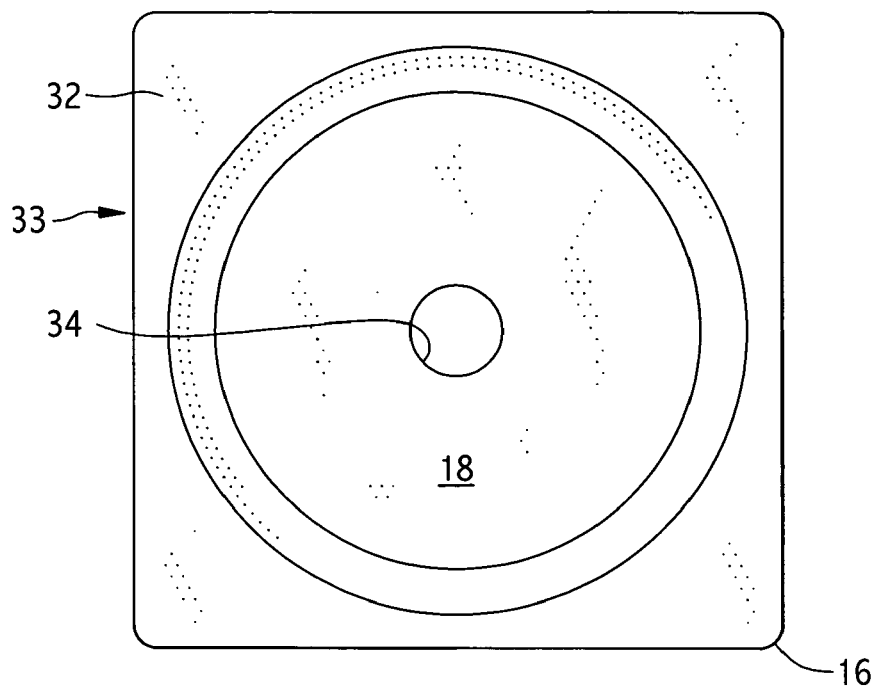
FIG. 4 is a bottom view of the swivel pad of the device of the of FIG. 1.
Figure 5:
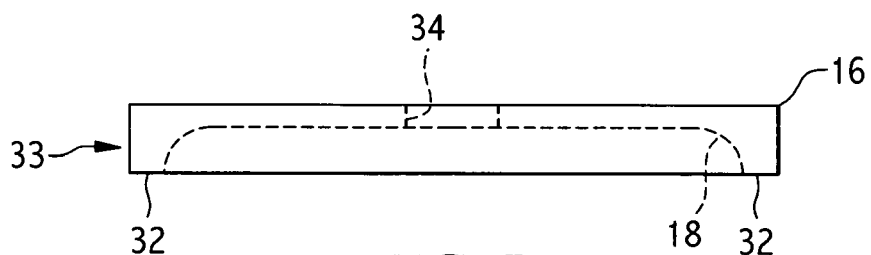
FIG. 5 is side plan view of the swivel pad of FIG. 5.

As illustrated in FIGS. 4 and 5, swivel pad 16 is comprised of an essentially flat, rectangular unitary metal slab, the slab including a flat topside 24 for supporting a foot 25 of piece of equipment 15 and an opposing bottom side 32 that includes downwardly facing concave portion 18 and lower edge 33. Concave portion 18 is centered on bottom side 32 and includes an unthreaded opening 34 that extends through a center of concave portion 18 thereby connecting topside 24 with bottom side 32.

Figure 6:
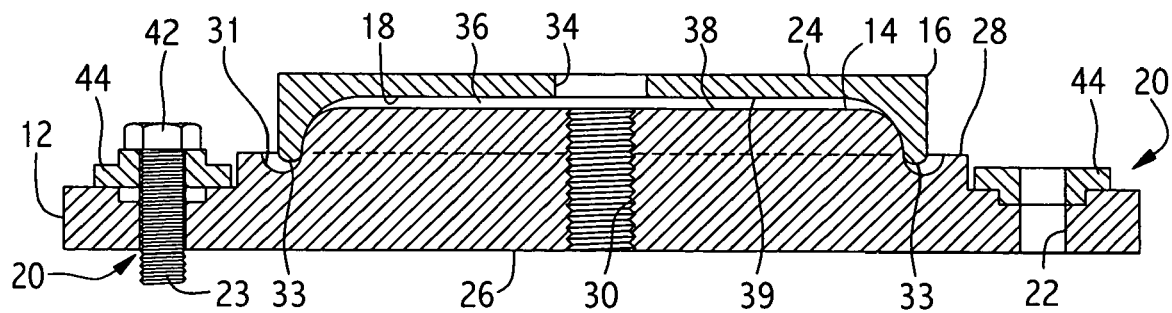
FIG. 6 is a vertical sectional view of the base of FIG. 2 through lines a-a with a swivel pad of FIG. 1 pivotally supported thereon.
Figure 7:
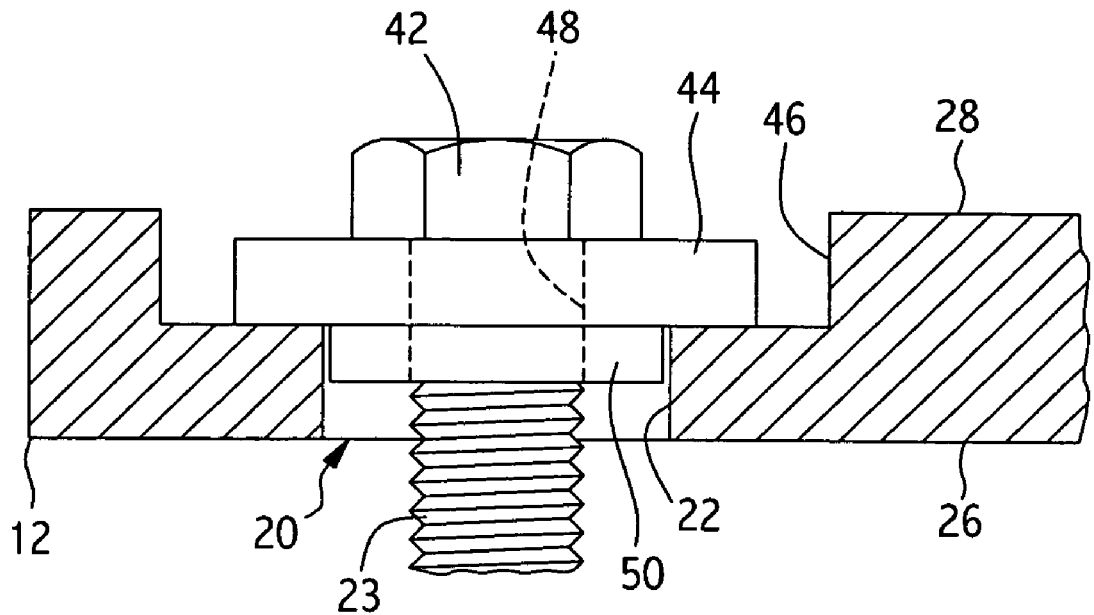
FIG. 7 is a partial sectional view of a lockdown mechanism of the device of FIG. 1 in an adjustable arrangement.
Figure 8:
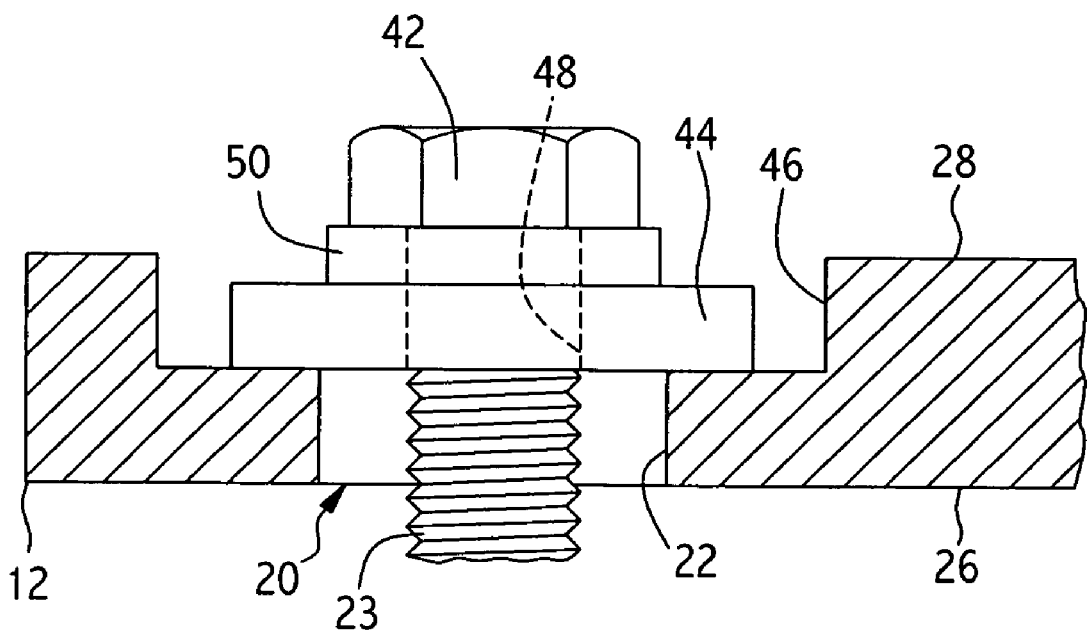
FIG. 8 is a partial sectional view of the lockdown mechanism of FIG. 7 in a locked arrangement.

Concave portion 18 and convex portion 14 each has a predetermined radius for allowing a predetermined amount of movement between concave portion 18 and convex portion 14 when joined. In particular, the radius of each of concave portion 18 and convex portion 14 allows enough movement therebetween to compensate for a maximum of 10° angularity between topside 24 of swivel pad 16 and lower surface 26 of base pad 12. Further, to make easier the swiveling of swivel pad 16 on base pad 12, it is preferred that, when joined, concave portion 18 and convex portion 14 define a space 36 therebetween. Thus, the entire respective surface areas of the joined concave portion 18 and convex portion 14 are preferably not in contact. As illustrated in FIGS. 1 and 6, to form space 36 between concave and convex portions 18 and 14, respectively, a substantially flat portion 38 about the apex of convex portion 18 and a substantially flat portion 39 about the center of concave portion 18 are provided. Space 36, formed between the joined concave and convex portions 18 and 14, decreases the amount of friction required to manipulate swivel pad 16 on base pad 12 since the amount of surface area in contact between the convex and concave portions 18 and 14 is decreased. Depending on the weight of equipment 15, it is preferred that about 50% to about 60% of the surface area of convex portion 14 is in contact with concave portion 18, for example, with lighter loads. In an embodiment supporting a medium load, it is preferred that about 60% to 70% of the surface area of convex portion 14 is in contact with concave portion 18. In an embodiment supporting a heavy load, it is preferred that about 70% to 80% of the surface area of convex portion 14 is in contact with concave portion 18. In yet another embodiment supporting a heavier load, it is preferred that about 80% to 95% of the surface area of convex portion 14 is in contact with concave portion 18.

To connect base pad 12 with mounting surface 11, mounting points 20 are arranged around convex surface 14 near the corners of base pad 12 to provide a broad base of attachment to surface 11. The unique design of each of mounting points 20 as described below allows for horizontal adjustment of base pad 12 across mounting surface 11 in any direction while supporting equipment 15 during alignment operations, even when base pad 12 positioned on anchor bolts 23. In particular, each of the mounting points 20 is defined by a counter bored area 46 having mounting hole 22 through the center thereof. Each hole 22 has diameter that is greater than the diameter of a respective anchor bolt 23 so that a predetermined amount of clearance between bolt 23 and the wall of hole 22 is present. This way, an anchor bolt 23 can be inserted through hole 22 of each mounting point 20 and base pad 12 can nevertheless be moved horizontally across mounting surface 11, such movement being limited by the interaction of the wall of hole 22 and bolt 23.

In this arrangement however base pad 12 can partially or completely disengage from anchor bolts 23 and mounting surface 11 during alignment operations. This is undesirable since equipment 15 is typically supported by base pad 12 at this time. If base pad 12 disengages from any one of anchor bolts 23, equipment 15 can tilt, become unbalanced, and ultimately turn over on its side. By providing a hold down washer 44 and a complementary nut 42 for each mounting point 20 according to the present invention, base pad 12 can be connected with anchor bolts 23 and still maintain the ability to be moved across mounting surface 11 without being disengaged from any one of bolts 23.

More particularly, each hold down washer is designed to allow movement of an anchor bolt 23 within a respective mounting hole 22 while in one orientator relative to mounting point 20, and to prevent such movement in a second orientator. Specifically, each washer 44 includes an unthreaded opening 48 therethrough for receiving a respective anchor bolt 23, opening 48 having a diameter substantially equal to the diameter of bolt 23, and a locking boss 50 protruding from one side of washer 44 being sized and shaped to fit snuggly within hole 22. On the exposed undersurface of washer 44 about locking base 50, a serrated or course finish can be imparted to the surface for better securement of washer 44 to surface 11. During alignment operations, when it is desired to move base pad 12 while preventing disengagement with bolts 23, each hold down washer 44 is placed over a respective bolt 23 with mounting boss 50 facing upwards. A respective nut 42 is then tightened over the exposed end of each bolt 23 so that base pad 12 cannot be disengaged from anchor bolts 23 by operation of washers 44. Since the diameter of each of bolts 23 is less than the diameter of its respective hole 22 in base pad 12, base pad 12 can be horizontally adjusted in any direction, limited only by the amount of clearance between bolts 23 and the walls of holes 22. Thus, each of counter bored areas 46 has a perimeter that is great enough to accommodate a washer 44 without limiting the movement of base pad 12 about anchor bolts 23.

To directly fix foot 25 of piece of equipment 15 to device 10, a mounting stud 40 is secured within threaded opening 30 in concave surface 14. Stud 40 extends perpendicularly upwards therefrom through unthreaded opening 34 in concave surface 18 of swivel pad 16 and through an aperture 41 in foot 25 to connect with foot 25. A nut 43 and washer are used to fix foot 25 to stud 40. In order to make easier the centering of stud 40 in aperture 41 of foot 25, the downward facing side of nut 43 includes a projection 45 extending at about a 30° to 45° angle and terminating in aperture 41. Once stud 40 is centered in aperture 40, a standard nut can replace nut 43.

Unthreaded opening 34 has a set diameter that is greater than the diameter of stud 40 to ensure that a predetermined amount of clearance exists between the continuous wall of opening 34 and stud 40. This way, swivel pad 16 can be pivoted on base pad 12 when stud 40 is located through opening 34. Preferably, the diameter of opening 34 relative to the diameter of stud 40 is sufficient to obtain 10° angularity between top side 24 of swivel pad 16 and bottom side 26 of base pad 12. Thus, depending on the radii of concave portion 18 and concave portion 14, in one embodiment, it is preferred that opening 34 has a diameter that is between about 0.05 and 2 times greater than the diameter of stud 40. In another embodiment, opening 34 has a diameter that is between about 0.1 and 1.5 times greater than the diameter of the stud 40. In yet another embodiment, opening 34 has a diameter that is between about 0.75 and 1 times greater than the diameter of the stud 40.

In use, base pad 12 is mounted on surface 11 by connecting mounting points 20 with anchor bolts 23 with washers 44 being positioned to allow horizontal adjustment of base pad 12 as described above. Swivel pad 16 is rested on base pad 12 with convex portion 14 and concave portion 18 joined and stud 40 extending from convex portion 14 through opening 34 of swivel pad 16. Each foot 25 of equipment 15 is placed over a device 10 and lowered so that a stud 40 is inserted into each aperture 41 of each foot 25. Since base pad 12 is horizontally adjustable in this arrangement, aligning studs 40 with apertures 41 is made easier when connecting foot 25 to device 10.

With equipment 15 resting on device 10, further horizontal movement of base pad 12 can be utilized if needed. In particular, a detachable side-mounted jackscrew member 52 is attached to base pad 12 for enabling slow, easy horizontal movement of base pad 12 and ultimately device 10 from side to side during this alignment phase. Jack-screw member 52 includes a rectangular block 54 having a connecting piece 56 that detachably connects with upper surface 28 of base pad 12 by fitting within a notch 58 therein. An adjustment screw 60 extends through block 52 for grasping by a user and has a length enabling it to contact foot 25 as illustrated in FIG. 1. Screw 60 terminates in a semi-point 61 for engaging foot 25. Semi-point 61 prevents screw 60 from moving from one side to the other of foot 25 during alignment by allowing screw 60 to press straight forward into and securely engage foot 25. Once horizontal adjustment of base pad 12 is completed, jack-screw member 52 can be removed.

Following horizontal adjustment of equipment 15 and device 10, the swiveling action permitted between convex portion 14 and concave portion 18 of swivel pad 16 and base pad 12, respectively, is utilized to manipulate the angle of equipment 15 relative to surface 11. This allows a user, whether utilizing the laser alignment method or the reverse indicator method, to finely adjust equipment 15 into a level arrangement and proper alignment with a second piece of equipment on mounting surface 11, whether the surface is a flat machined surface or an uneven or pitched surface. Angular movement of equipment 15 on device 10 can be performed by applying pressure to the sides of equipment 10 or by pivoting by hand swivel pad 16.

When it is desired to fix base pad 12 to mounting surface 11, each washer 44 is removed from its respective bolt 23, flipped over and placed back onto bolt 23 with locking boss 50 inserted into hole 22. Each nut 42 is then tightened onto the exposed end of a respective bolt 23. This way, base pad 12 is fixed to mounting surface 11 with locking boss 50 preventing horizontal movement of base pad 12 and nut 42 and washer 44 preventing vertical movement. It is preferred that anchor bolts 23 be at least 25% stronger than stud 40.

As will be apparent to one skilled in the art, various modifications can be made within the scope of the aforesaid description. Such modifications being within the ability of one skilled in the art form a part of the present invention and are embraced by the claims below.

It is claimed:

1. A leveling apparatus comprising,
a first member having a circular convex portion,
a mounting stud connected with the convex portion,
a second member having concave portion, and
a hole in the concave portion,
wherein the concave portion is directed towards and coupled to the convex portion and the mounting stud is spaced apart from the second member and wherein the first member includes an opening therethrough and a counter bored area surrounding the opening on a topside of the first member.

2. A leveling apparatus comprising,
a first member having a circular convex portion,
a mounting stud connected with the convex portion,
a second member having a concave portion,
a space defined by the convex portion and the concave portion, and
a hole in the concave portion,
wherein the concave portion is directed towards and coupled to the convex portion, the convex portion and the concave portion are pivotally coupled and the mounting stud is spaced apart from the second member and extends through the hole.

3. The apparatus according to claim 2 wherein less than about 70% of the surface area of the convex portion is in contact with the concave portion.

4. A leveling apparatus comprising,
a first member having a circular convex portion,
a mounting stud connected with the convex portion,
a second member having a concave portion, and
a hole in the concave portion,
wherein the concave portion is directed towards and coupled to the convex portion and the mounting stud is spaced apart from the second member, wherein the stud extends through the hole, wherein the convex portion and the concave portion are pivotally coupled and wherein the first member includes a groove around the convex portion and the second member includes a lip around the concave portion that interacts with the groove.

5. The apparatus according to claim 1 further comprising a washer having an aperture therethrough, the aperture having a diameter that is less than a diameter of the opening.

6. The apparatus according to claim 5 wherein the washer includes a locking boss having a diameter that substantially equal to the diameter of the opening.

7. A leveling apparatus comprising,
a base member for anchoring the apparatus to a mounting surface, the base member including a circular upwardly convexly curved surface on topside thereof,
a top member including a concavely curved surface on a bottom side thereof, the concavely curved surface being movably supported on the convexly curved surface,
a hole having a hole wall, the hole extending through the top member,
a mounting stud extending upwardly from the base member and through the hole, and
a space defined between the convexly curved surface and the concavely curved surface
wherein the hole includes a predetermined amount of clearance between the hole wall and the mounting stud.

8. A kit for mounting a piece of equipment to a mounting surface comprising,
a first member including (i) a circular upwardly facing convex portion, (ii) a plurality of openings extending through the first member and positioned around the convex portion, each one of the plurality of openings having a first diameter and (iii) a counter bored area bordering each opening of the plurality of openings,
a mounting stud, a second member including (i) a downwardly facing concave portion, and (ii) a hole through the concave portion having a second diameter greater than a third diameter of the stud, and a plurality of washers, each one of the plurality of washers including (i) an aperture having a fourth diameter that is less than the first diameter, and (ii) a locking boss having a fifth diameter that is substantially equal to the first diameter, and a jack screw detachably connectable with the first member.

9. A leveling apparatus comprising, a first member having a circular convex portion, a mounting stud connected with the convex portion, a second member having a concave portion, and a hole in the concave portion, wherein the concave portion is directed towards and coupled to the convex portion and the mounting stud is spaced apart from the second member, wherein the first member includes an opening therethrough and a counter bored area surrounding the opening on a topside of the first member, and wherein an anchor bolt extends out of a floor, through the opening and into the counter bored area.

* * * * *